J. JOHNSTON.

Roller and Harrow.

No. 66,240.                                         Patented July 2, 1867.

Witnesses.

Inventor.

James Johnston
By D. E. Somes & Co.
His Attys.

United States Patent Office.

JAMES JOHNSTON, OF PEMBERTON, OHIO.

Letters Patent No. 66,240, dated July 2, 1867.

IMPROVEMENT IN COMBINED PLOUGH, HARROW, CULTIVATOR, AND ROLLER.

The Schedule referred to in these Letters Patent and making part of the same.

TO ALL WHOM IT MAY CONCERN:

Be it known that I, JAMES JOHNSTON, of Pemberton, in the county of Shelby, and in the State of Ohio, have invented a new and useful Combined Plough, Harrow, Cultivator, and Roller; and I do hereby declare that the following is a full, clear, and exact description thereof, reference being had to the annexed drawings, making part of this specification, in which—

Figure 1:
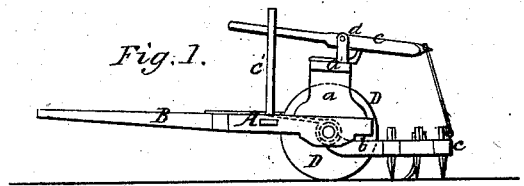

Figure 1 is a side elevation of my invention.

Figure 2:
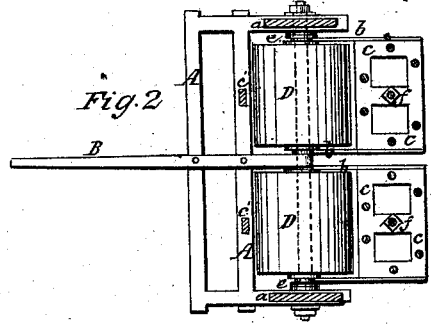

Figure 2, a plan or top view thereof as arranged for the preparation of the ground preliminary to planting.

Figure 3:
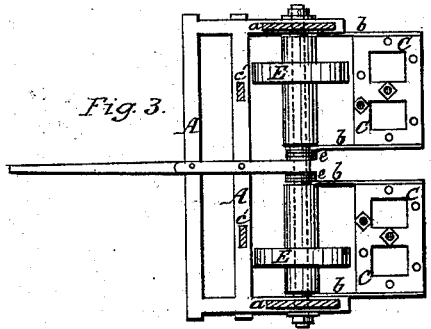
Figure 4:

Figure 3 is a plan of the same, showing it as arranged for cultivating the grain after planting; and Figure 4 is a view of a part detached.

In the drawings, A A is the draught-frame to which the tongue B is attached. A standard, $a\ a$, rises from each of the side beams of the frame A, and on the centre of the cross-piece $a'$, extending from one standard to the other, is the driver's seat over the centre of the axle. In figs. 2 and 3 the seat is not shown. The axle is a cylindrical shaft, shown in dotted lines in figs. 1, 2, 3, has its bearings in the side beams of the frame, and is kept from slipping endways by a screw and nut at each end. The inner end of the tongue is a strap joint through which the axle passes, thus receiving support at the middle as well as at the ends. C C are two harrow-frames, so connected by arms or strap, $b$, of metal to the axle, as to allow them to vibrate as their teeth pass over the inequalities of the surface, or permit them to be lifted entirely clear of it. This is effected by levers $c\ c$ attached at one end by a connecting-rod to the centre of the rear of each of the harrow-frames, and having their fulcra at $d$ on each side of the driver. The front ends of the levers are within reach of the driver, and when they are depressed so as to lift the harrows clear of the ground, they may be caught in notches or latches on the uprights $c'\ c'$ rising from the frame A. The teeth of the harrows are removable and their places can be supplied by shovels or cultivators, having shanks fitted for the purpose, as shown in fig. 4. D D, figs. 1 and 2, are two rollers for breaking the clods in a ploughed field, and revolve upon the axle which passes through them. E E are two trucks, having the same diameter, and fitted on hubs of the same length as the rollers so that they may be put in place of the rollers when necessary. $e\ e$ are washers, each composed of three or more rings to be placed near the ends of the axle, or near its centre, as occasion may require. When corn is to be planted, the rollers D are placed upon the axle, with the washers $e$ placed as shown in fig. 2. The harrows are fitted with teeth and one furrowing plough or shovel $f$. As the implement moves, the soil is broken, the harrows immediately follow, and two furrows are cut at once at the proper distance apart. When the field has been furrowed in one direction, the trucks E are put in place of the rollers, the harrow-teeth removed, and the furrows are then made two at once across those first made.

In working the corn after planting either rollers or trucks may be used with the washers $e\ e$, or a part of their number placed next the tongue, as in fig. 3, so that the shovels or cultivators, of which two or more may be used, may be set near or further from the corn, as may be desirable. The harrow-teeth in some cases may be used as cultivators. When wheat is to be sown, the rollers and a full set of cultivators are to be used together, acting on the soil like a drill.

Having thus fully described my invention, what I claim therein as new, and desire to secure by Letters Patent, is—

The rollers D, and trucks E, or either of them, and the harrow-frames C, adapted to receive harrow-teeth, shovels, or cultivators, and to be lifted by the levers $c$, in combination with the axle and the adjusting washers $e$, the whole arranged and operating substantially as set forth.

In testimony that I claim the above-described combined plough, harrow, cultivator, and roller, I have hereunto signed my name this 3d day of May, 1867.

JAMES JOHNSTON.

Witnesses:
WM. PROCTOR,
JACOB KERNS.